May 26, 1970     D. ENGELSMANN ET AL     3,514,587

FLASH UNIT

Filed July 31, 1967     2 Sheets-Sheet 1

INVENTORS
DIETER ENGELSMANN
ROLF SCHRÖDER
HUBERT HACKENBERG
ENGELBERT FLIESSER

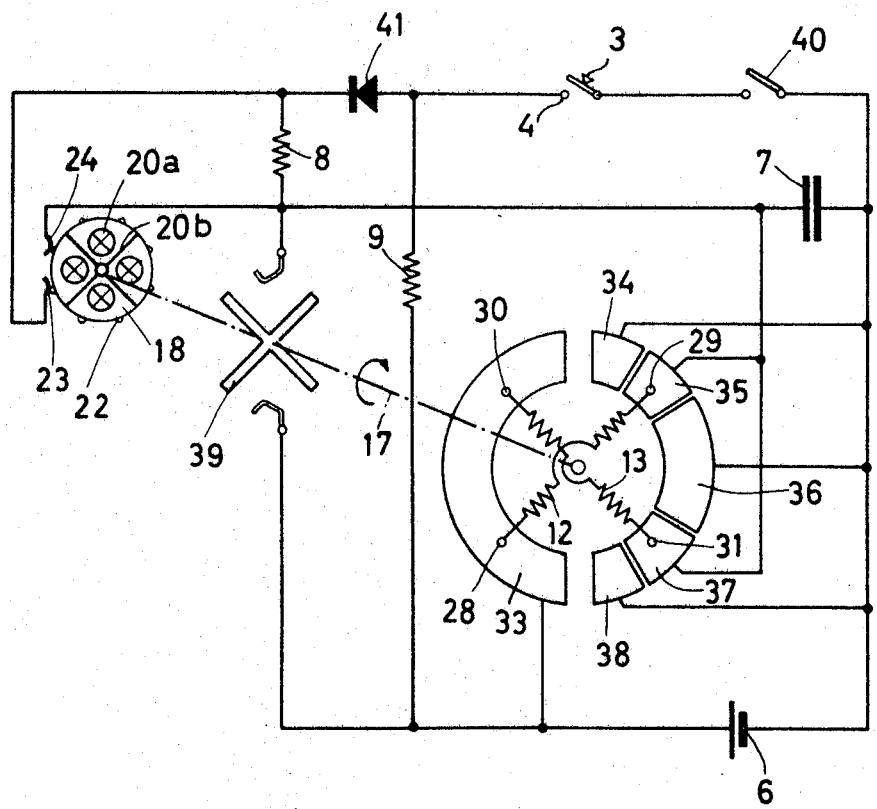

United States Patent Office 3,514,587
Patented May 26, 1970

3,514,587
FLASH UNIT
Dieter Engelsmann, Unterhaching, and Rolf Schröder, Hubert Hackenberg and Englebert Fliesser, Munich, Germany, assignors to Agfa-Gevaert Aktiengesellschaft, Leverkusen, Germany
Filed July 31, 1967, Ser. No. 657,279
Claims priority, application Germany, Aug. 20, 1966, A 53,303
Int. Cl. G03b 15/02
U.S. Cl. 240—1.3       21 Claims

ABSTRACT OF THE DISCLOSURE

A flash unit for a multiple flash bulb holders consisting of a rotary support carrier for the holder, a magnetic indexing mechanism, and electrical circuit for controlling the operation of the indexing mechanism. The magnetic indexing mechanism includes a stationary magnetic part, and a rotor which is connected to the support carrier and has a plurality of stable positions of rest. The electrical circuit includes a source of electrical energy, winding coils for producing a magnetic field, and a switch element for temporarily connecting the coils to the source to thereby produce a magnetic field which turns the rotor to index the bulb holder. The rotor has flutes therein around which the coils are wound. The stationary magnetic part automatically arrests movement of the rotor in one of its positions of rest when a fresh flash bulb has been indexed into firing position and the switch element is opened.

BACKGROUND OF THE INVENTION

The present invention relates to flash units for photographic cameras, and more particularly to improvements in flash units which utilize indexible multiple flash bulb holders. Still more particularly, the invention relates to flash units wherein a fresh flash bulb is placed into an optimum position for illumination of the subject in response to firing of a preceding flash bulb.

Presently known flash units with turnable sockets for multiple flash bulb holders normally employ indexing devices which includes a ratchet and pawl drive. Such drives are often bulky, complicated, prone to malfunction and produce too much noise.

SUMMARY OF THE INVENTION

It is an object of our invention to provide a simple, compact, practically noiseless and reliable indexing device for use in flash units wherein a multiple flash bulb holder must be turned to place a succession of flash bulbs into requisite position with reference to the subject or scene.

Another object of the invention is to provide a flash unit which embodies the novel indexing device and which can be assembled as a separate entity or may be built into the body of a photographic camera.

A further object of the invention is to provide an indexing device which can operate properly without detents and which invariably places a fresh flash bulb into requisite position in automatic response to completion of an exposure with flash.

An additional object of our instant invention is to provide a B-C flash unit wherein certain parts of the indexing device contribute to rapid charging of the capacitor during intervals between successive exposures with flash.

A concomitant object of the invention is to provide an electromagnetically operated indexing device for use in B-C flash units.

Briefly outlined, the invention resides in the provision of a flash unit for use with multiple flash bulb holders which must be indexed to place selected or successive flash bulbs into an optimum position for illumination of the subject. The flash unit comprises a casing which may constitute a separable or an integral part of a camera body, a rotary carrier which is arranged to detachably support and to index a multiple flash bulb holder, an electromagnetic indexing device including a stationary part or stator preferably comprising two pole shoes of hard magnetic material, a rotor affixed to the carrier and rotatable between the pole shoes, and a winding carried by the rotor and preferably including two coils disposed in two planes making right angles with each other and intersecting each other along the rotor axis, a source of electrical energy, and current conducting means including a synchronizing switch and a collector which latter can connect the winding in circuit with the source so that the field of the winding turns the rotor in a predetermined direction to index the holder through the carrier between successive positions of rest.

The novel features which are considered as characteristic of the invention are set forth in particular in the appended claims. The improved flash unit itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a diagram showing the electric circuitry of the flash unit.

DESCRIPTION OF THE PREFERRED EMBODIMENTS

Figure 1:
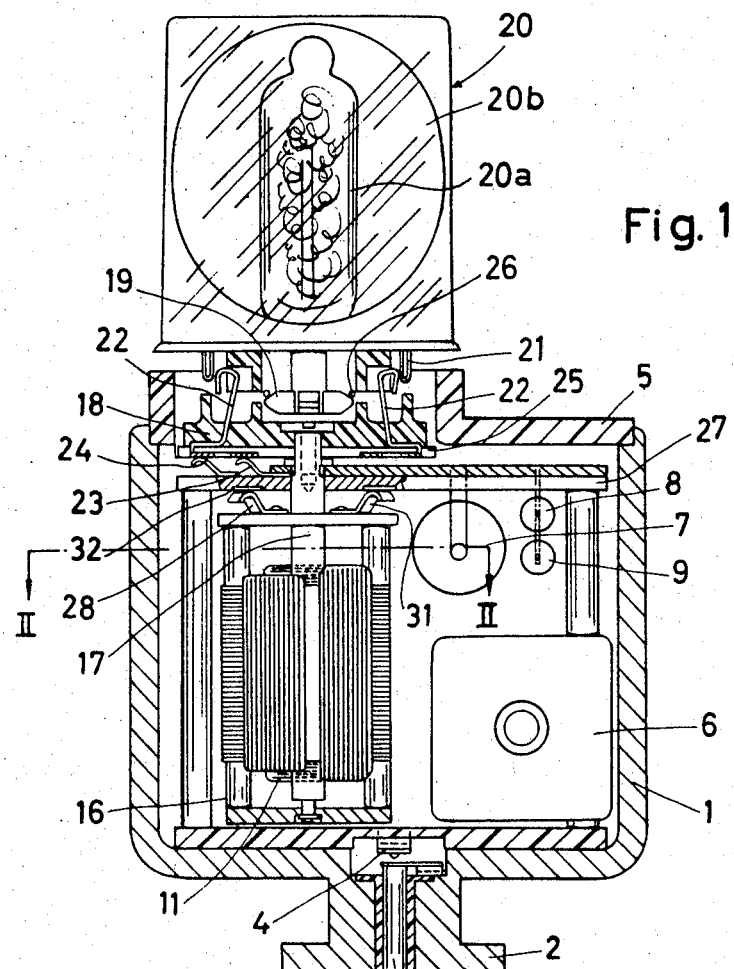
FIG. 1 is an axial sectional view of a flash unit which embodies one form of our invention and which is intended to be used with "Flashcubes," the section being taken in the direction of arrows as seen from the line I—I of FIG. 2.

Referring first to FIG. 1, there is shown a self-contained B-C flash unit which can be attached to a photographic camera. This flash unit comprises a casing 1 whose bottom wall carries a foot 2 insertable into the standard shoe of a camera, not shown. The foot 2 is provided with a vertically movable conductor pin 3 which can engage a central contact 4 mounted in the bottom wall of the casing 1 at a level above the foot.

Figure 2:
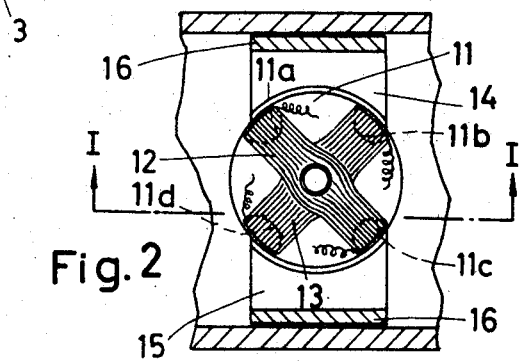
FIG. 2 is a horizontal section as seen in the direction of arrows from the line II—II of FIG. 1.

The top part of the casing 1 is normally closed by a cover or lid 5. This casing accommodates a source of electrical energy, preferably in the form of a battery 6, a capacitor 7, resistors 8, 9, 10, and an electromagnetic indexing device which is constructed and assembled in accordance with a feature of the present invention. The indexing device includes a soft magnetic rotor 11 which resembles an upright body of cylindrical outline and is provided with axially parallel peripheral grooves or flutes 11a, 11b, 11c, 11d (see FIG. 2) which are equidistant from each other. These flutes accommodate two crossing coils 12, 13 of a winding. The planes of the coils 12, 13 intersect each other along the rotor axis.

Two hard magnetic pole shoes 14, 15 of the stationary part of the indexing device are connected to each other by a yoke 16 and flank the rotor 11 at opposite sides of the rotor axis, each along an arc of approximately 90 degrees. The rotor 11 is affixed to a motion transmitting shaft 17 which is journalled in the casing 1 and the upper end portion of which is rigid with a carrier 18 consisting of insulating material and serving as a socket for the star-shaped foot 19 of a multiple flash bulb holder 20 of the type commonly known as "Flashcube." This multiple flash bulb holder has four flash bulbs 20a each of which is located in front of a reflector 20b and is provided with two electric contacts 21. When the holder 20 is properly coupled to the socket 18, each contact 21 engages one of several contacts 22 on the socket. The plug 19 is then yieldably retained by a suitable spring 26 which is installed in the socket 18. The contacts 21 and 22 form two concentric circles of contacts and the contacts 22 extend downwardly through the body of the socket 18 so that two of these contacts may engage fixed contacts 23, 24 mounted on an insulating plate 27 which is non-rotatably installed in the casing 1. The contacts 23, 24 are connected in the flash circuit of the flash unit. The arrangement is such that the contacts 23, 24 are conductively connected with the contacts 21 of that flash bulb 20a which faes the subject or scene, i.e., which is ready to illuminate the subject in response to completion of its circuit. The numeral 25 denotes a supporting disc for the contacts 22 which is connected with the socket 18.

The underside of the insulating plate 27 carries a series of conductive portions 33–38 in the form of segments (see FIG. 3) which together form an annular current conducting collector 32. These segments are tracked by sliding contacts 28–31 of the coils 12 and 13.

FIG. 3 illustrates the electrical circuitry of the flash unit. This circuitry includes three interrelated circuits including a charging circuit for the capacitor 7 wherein the coils 12, 13 perform the function of resistors. A torque producing or indexing circuit which effects indexing of the multiple flash bulb holder 20 when the coils 12, 13 conduct current at full strength, and the aforementioned flash circuit.

The charging circuit includes the capacitor 7, the coils 12, 13, the battery 6 and the aforementioned annular collector 32. As stated before, the collector 32 is mounted at the underside of and is preferably printed onto the insulating plate 27. The segment 33 extends along an arc of nearly 180 degrees and is connected with one pole of the battery 6. The remaining five segments 34–38 fill the rest of a circle (i.e., they extend along an arc of about 180 degrees opposite the segment 33). The segments 35, 37 alternate with segments 34, 36, 38 and extend along arcs of substantially 30 degrees. They are connected with one terminal of the capacitor 7. The other terminal of this capacitor is connected with the other pole of the battery 6. In a certain angular position of the sliding contacts 28–31, the coils 12, 13 are connected in parallel and function as a resistor in the charging circuit. The segments 34, 38 are of equal size and extend along angles of approximately 30 degrees. The median segment 36 which is disposed between the segments 35, 37 extends along an arc of about 60 degrees. The segments 34, 36, 38 are connected directly with the other pole of the battery 6.

A cruciform switching element 39 is connected in parallel with the coils 12, 13 and is mounted for rotation with the shaft 17. In a certain angular position of the rotor 11, namely, when two of the sliding contacts 28–31 (29, 31 or 30, 29 or 28, 30 or 31, 28) have moved beyond the segments 35 and 37, the switching member 39 closes for a short interval of time to thereby connect the capacitor 7 directly with the battery 6 so that the capacitor can be charged without the interposition of any resistors.

The flash circuit includes a synchronizing switch 40, a rectifier in the form of a diode 41, the fixed contacts 23, 24 and the capacitor 7.

The aforementioned resistor 8 is connected in parallel with the fixed contacts 23, 24. Its function is to insure complete discharge of the capacitor 7 after firing of a flash bulb 20a. The synchronizing switch 40 is connected with the one pole of the battery 6 through the resistor 9.

The operation is as follows:

Prior to making an exposure with flash, all of the parts of the flash unit assume the positions shown in FIG. 3. The multiple flash bulb holder 20 is attached to the socket 18, ie., its plug 19 is yieldably held by the spring 26. The capacitor 7 is charged through the coils 12, 13 even before the holder 20 is attached to the socket 18. The operator then closes the synchronizing switch 40 for a certain period of time whereby the capacitor 7 discharges through the diode 41 and that flash bulb 20a which faces the subject. When the filament of the bulb that faces the subject is destroyed, the thus fired bulb interrupts the flow of current between its contacts 21, i.e., there is no current flow between the fixed contacts 23, 24. In order to insure complete discharge of the capacitor 7, the resistor 8 is connected in parallel with that flash bulb 20a which is about to be fired.

Recharging of the capacitor 7 begins even before the latter is completely discharged. Such recharging takes place through the coils 12, 13. However, and since the capacitor 7 is discharged considerably in the initial stage of the firing of a bulb 20a, i.e., at the time when the bulb is in the process of being fired, it is undesirable to begin the indexing of the holder 20 at such an early stage of firing. To this end, the synchronizing switch 40 (which is still closed) then completes the circuit of the battery 6 through the resistor 9 so that current flowing through the coils 12, 13 is too weak to effect a turning of the shaft 17 and holder 20. In other words, the field of the coils 12, 13 cannot produce a torque which would suffice to index the multiple flash bulb holder. Therefore, the rotor 11 continues to remain in one of four positions of rest.

The capacitor 7 can build up a considerable charge while the synchronizing switch 40 remains closed. When the operator releases the switch 40 so that the latter's moving contact interrupts the flow of current, the capacitor 7 is again charged through the coils 12 and 13. Since the flow of current through the resistor 9 is interrupted in response to opening of the synchronizing switch 40, current can flow through the coils 12, 13 at full strength and these coils then cause the rotor 11 to turn so that the sliding contacts 29, 31 move beyond the segments 35, 37. These contacts 29, 31 then engage the segments 36, 38 which are connected directly with the other pole of the battery 6. Therefore, the rotor 11 continues to turn until the contacts 29, 31 move across the next-following gaps, i.e., until these contacts 29, 31 respectively engage the segments 37 and 33. The angular movement needed to place the sliding contacts 29, 31 into engagement with the segments 36, 38 does not exceed 45 degrees.

As the rotor 11 turns, it causes the shaft 17 to turn the socket 18 with the multiple flash bulb holder 20 and also the switching element 39. The latter closes for a short interval of time to insure full charging of the capacitor 7 without the interposition of resistors. The capacitor 7 is then charged by being connected directly with the battery 6. The flow of current through the coils 12, 13 is terminated in response to full charging of the capacitor 7 across the switching element 39. Therefore, the rotor 11 comes to a halt when the sliding contacts 29, 31 respectively engage the segments 37 and 33, i.e., after the multiple flash bulb holder 20 has completed a quarter turn. The angular position of the rotor 11 is then determined by the pole shoes 14, 15. The rotor 11 will be automatically arrested in an angular position in which an unfired flash bulb 20a faces the subject because the magnetic flux finds a minimal resistance to flow through the rotor 11 when two of the flutes 11a–11d face each of the pole shoes 14, 15. This is the case when the rotor 11 has completed one fourth of a full revolution. Each flute is of substantially semicircular cross-sectional outline and the depth of these flutes is selected in such a way that the magnetic flux between the pole shoes 14, 15 is strongest in the four positions of rest of the rotor 11.

In the new angular position of rest of the rotor 11, the capacitor 7 could discharge despite the fact that the synchronizing switch 40 is open, namely, through the segments 35, 37, coils 12, 13, segment 33, resistor 9 and that (unfired) flash bulb 20a which faces the subject. In order to avoid such firing without closing of the synchronizing switch 40, the circuitry includes the aforementioned diode 41 which is installed in the flash circuit and allows firing of a flash bulb only when the current flows in one of two directions.

When the sliding contacts 29, 31 respectively engage the segments 37, 33, the contact 30 engages the segment 35. The flash unit is then ready for the next exposure in response to closing of the synchronizing switch 40. The direction of current flow through the coils 12, 13 is reversed in response to each quarter turn of the rotor 11.

Savings in electric current can be achieved if the resistor 9 is replaced with an auxiliary switch (not shown) which opens in response to closing of the synchronizing switch 40. Such auxiliary switch can positively prevent turning of the shaft 17 and multiple flash bulb holder 20 during firing of a flash bulb 20a, i.e., during the period when the synchronizing switch 40 is closed. The auxiliary switch is preferably provided in flash units which are built directly into the housing of a camera (i.e., wherein the casing 1 is replaced by or forms part of the camera body). The auxiliary switch is then mechanically coupled with the synchronizing switch in such a way that one of these switches opens when the other closes, or vice versa.

It is clear that our flash unit is susceptible of many additional modifications without departing from the spirit of the invention. As stated before, the flash unit can be built into the body of a camera and the socket 18 may be designed to accept other types of multiple flash bulb holders which must be moved or indexed subsequent to firing of a bulb in order to place the next bulb or bulbs into an optimum position for illumination of the subject.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. A flash unit for use with multiple flash bulb holders, comprising a rotary holder-supporting carrier; magnetic indexing means including a stationary magnetic part and a rotor adapted to assume during rotation a plurality of stable positions of rest, said rotor being connected to said carrier so that the latter shares angular movements of said rotor; and electromagnetic circuit means including winding means carried by said rotor, a source of electric energy, and current-conducting means including switch means for temporarily connecting said winding means in circuit with said source so that the field of said winding means turns the rotor in a predetermined direction from one of said plurality of stable positions of rest towards the next stable position of rest thereof so as to index the holder by way of said carrier.

2. A flash unit as defined in claim 1, wherein said rotor comprises a soft magnetic body and said winding means comprises two coils making right angles with each other.

3. A flash unit as defined in claim 2, wherein said rotor body is a cylinder having four equidistant axially parallel peripheral flutes disposed in two planes which are normal to each other, each of said coils extending into the flutes in one of said planes.

4. A flash unit as defined in claim 3, wherein each of said flutes is of substantially semicircular cross-sectional outline and wherein said stationary part comprises two pole shoes flanking said rotor from opposite sides of the rotor axis, the depth of said flutes being such that the magnetic flux between said pole shoes is strongest in four equidistant angularly spaced stable positions of rest of said rotor.

5. A flash unit as defined in claim 2, wherein said stationary part comprises two pole shoes flanking said rotor from opposite sides of the rotor axis and wherein said current conducting means is arranged to change the direction of current flow through said coils in response to each indexing movement of said rotor.

6. A flash unit for use with multiple flash bulb holders, comprising a rotary holder-supporting carrier; an electromagnetic indexing device including a stationary part, a rotor affixed to said carrier and adjacent to said stationary part, and winding means carried by said rotor, said rotor comprising a soft magnetic body and said winding means comprising two coils making right angles with each other; a source of electrical energy; current conducting means including switch means for connecting said winding means in circuit with said source so that the field of said winding means turns the rotor in a predetermined direction to index the holder through said carrier; and capacitor means having a first terminal connected with one pole of said source and a second terminal, said current conducting means further comprising collector means having portions connecting said coils between said second terminal and the other pole of said source when said rotor is in one of several successive positions of rest.

7. A flash unit as defined in claim 6, wherein said portions of said collector means are arranged to connect said second terminal directly with said other pole in response to movement of said rotor away from said one position of rest.

8. A flash unit as defined in claim 7, wherein said angular movement at most equals 45 degrees.

9. A flash unit as defined in claim 7, wherein said collector means is arranged to connect said coils with said second terminal and with said other pole shortly before the rotor assumes a position of rest.

10. A flash unit for use with multiple flash bulb holders, comprising a rotary holder-supporting carrier; an electromagnetic indexing device including a stationary part, a rotor affixed to said carrier and adjacent to said stationary part, and winding means carried by said rotor, said rotor comprising a soft magnetic body and said winding means comprising two coils making right angles with each other; a source of electrical energy; current conducting means including switch means for connecting said winding means in circuit with said source so that the field of said winding means turns the rotor in a predetermined direction to index the holder through said carrier, and an annular collector having a first segment extending along an arc of about 180 degrees and connected with one pole of said source, three additional segments each connected with the other pole of said source, and a pair of further segments alternating with said additional segments, each of said coils having a pair of sliding contacts which track said segments; and capacitor means connecting said further segments with the other pole of said source.

11. A flash unit as defined in claim 10, further comprising a stationary member of insulating material, said segments being printed onto said stationary member.

12. A flash unit as defined in claim 10, wherein the sliding contacts of each of said coils are disposed diametrically opposite each other with reference to the axis of said rotor.

13. A flash unit as defined in claim 10, wherein said additional segments include a median segment disposed between said further segments and extending along an arc whose length is twice the length of the arc of either one of the other two additional segments.

14. A flash unit for use with multiple flash bulb holders, comprising a rotary holder-supporting carrier; an electromagnetic indexing device including a stationary part, a rotor affixed to said carrier and adjacent to said stationary part, and winding means carried by said rotor; a source of electrical energy; current conducting means including switch means for connecting said winding means in circuit with said source so that the field of said winding means turns the rotor in a predetermined direction to index the holder through said carrier, and capacitor means having a first terminal connected with one pole of said source and a second terminal, said current conducting means further comprising means for connecting said winding means between said second terminal and the other pole of said source, at least when said rotor is idle, and switching means arranged to connect said second terminal with said other pole in parallel with said winding means during each angular displacement of said rotor.

15. A flash unit as defined in claim 14, wherein said switching means comprises a current-conducting element which shares the movements of said rotor.

16. A flash unit as defined in claim 15, wherein said element is arranged to connect said second terminal with said other pole during a fraction of each angular displacement of said rotor and while said winding means is disconnected from said other terminal.

17. A flash unit for use with multiple flash bulb holders, comprising a rotary holder-supporting carrier; an electromagnetic indexing device including a stationary part, a rotor affixed to said carrier and adjacent to said stationary part, and winding means carried by said rotor; a source of electrical energy; current conducting means including switch means comprising a synchronizing switch for connecting said winding means in circuit with said source so that the field of said winding means turns the rotor in a predetermined direction to index the holder through said carrier; and resistor means connected in series with said switch and in parallel with said winding means.

18. A flash unit for use with multiple flash bulb holders, comprising a rotary holder-supporting carrier; an electromagnetic indexing device including a stationary part, a rotor affixed to said carrier and adjacent to said stationary part, and winding means carried by said rotor; a source of electrical energy; current conducting means including switch means for connecting said winding means in circuit with said source so that the field of said winding means turns the rotor in a predetermined direction to index the holder through said carrier; and a flash circuit including said switch means, a pair of fixed contacts bridged by a fresh flash bulb of the holder when said rotor is idle, resistor means connected in parallel with said fixed contacts, and capacitor means connected in series with said switch means and said fixed contacts.

19. A flash unit for use with multiple flash bulb holders, comprising a rotary holder-supporting carrier; an electromagnetic indexing device including a stationary part, a rotor affixed to said carrier and adjacent to said stationary part, and winding means carried by said rotor; a source of electrical energy; current conducting means including switch means for connecting said winding means in circuit with said source so that the field of said winding means turns the rotor in a predetermined direction to index the holder through said carrier; and a flash circuit including said switch means, a pair of fixed contacts adapted to be bridged by a flash bulb in the holder which is supported by said carrier, capacitor means connected in series with said fixed contacts, and rectifier means for permitting unidirectional flow of current in said flash circuit.

20. A flash unit for use with multiple flash bulb holders of the type having a pair of contacts for each of the flash bulbs therein, comprising a rotary holder-supporting carrier including second contacts each engaging with one contact of the holder which is supported thereby; an electromagnetic indexing device including a stationary part, a rotor affixed to said carrier and adjacent to said stationary part, and winding means carried by said rotor; a source of electrical energy; current conducting means including switch means for connecting said winding means in circuit with said source so that the field of said winding means turns the rotor in a predetermined direction to index the holder through said carrier; and a flash circuit including said switch means, capacitor means chargeable through said winding means, and a pair of fixed contacts each engaging one of said second contacts when the rotor is idle to thereby connect one flash bulb in said flash circuit.

21. A flash unit as defined in claim 20, wherein said rotor comprises a shaft and said carrier is constituted by a socket of insulating material rigid with said shaft.

References Cited

UNITED STATES PATENTS

| | | | |
|---|---|---|---|
| 408,206 | 8/1889 | Boissier | 310—265 |
| 2,258,575 | 10/1941 | MacKay | 240—37.1 |
| 3,312,086 | 4/1967 | Casebeer et al. | 240—1.3 XR |
| 3,374,720 | 3/1968 | Harvey | 240—1.3 XR |

NORTON ANSHER, Primary Examiner

F. L. BRAUN, Assistant Examiner

U.S. Cl. X.R.

240—37.1; 95—11.5